United States Patent [19]
Rodov

[11] 3,803,835
[45] Apr. 16, 1974

[54] METHOD FOR STARTING ACTUATING MEMBER OF MACHINE AND DEVICE FOR PERFORMING IT

[76] Inventor: Grigory Matveevich Rodov, ulitsa 3, Internationala, 9 kv. 25, Voronezh, U.S.S.R.

[22] Filed: Nov. 8, 1972

[21] Appl. No.: 304,831

[52] U.S. Cl. .......................... 60/6, 60/327, 60/413, 60/414
[51] Int. Cl. ............................................ F01b 21/00
[58] Field of Search ........... 60/371, 413, 414, 10, 6, 60/327

[56] References Cited
UNITED STATES PATENTS

| | | | |
|---|---|---|---|
| 2,628,476 | 2/1953 | Grier | 60/413 X |
| 2,755,898 | 7/1956 | Bell | 60/414 X |
| 3,305,195 | 2/1967 | Eickmann | 60/413 X |

FOREIGN PATENTS OR APPLICATIONS

| | | | |
|---|---|---|---|
| 152,673 | 5/1932 | Switzerland | 60/6 |
| 319,921 | 7/1934 | Italy | 60/6 |

*Primary Examiner*—Edgar W. Geoghegan
*Attorney, Agent, or Firm*—Eric H. Waters

[57] ABSTRACT

The kinetic energy of a accelerated driven link and actuating member connected therewith is accumulated during braking, the energy being subsequently utilized to accelerate the driven link prior to its coupling with a driving link up to a speed which is close to the speed of the latter, thus providing a non-shock and, actually, non-slipping coupling between the driven and the driving links of the transmission.

The device comprises an accumulator connected to a transmission driven link through a converter which serves to deliver the energy taken off in the course of braking the accelerated link and actuating member to the accumulator and therefrom - to the driven link to impart so as the latter a speed which is close to the speed of the driving link prior to their coupling.

4 Claims, 3 Drawing Figures

METHOD FOR STARTING ACTUATING MEMBER OF MACHINE AND DEVICE FOR PERFORMING IT

The present invention relates to the field of mechanical engineering, and more particularly, to methods for starting and braking the actuating member of a machine operating in the mode of repeating cycles, and to a devices for performing these methods.

It is most expedient to apply the method and the device of the present invention to forge-and-press machines.

It is also advantageous to apply the said method and the device to transport vehicles operating with frequent stops, for example, buses operating on city routes, coaches for rapid transit trains, etc.

A method for starting the actuating member of a machine is well known and is characterized in that the driven link of the transmission, which is kinematically connected to the actuating member, is accelerated due to the frictional moment developed in the course of coupling the driven link to the driving link, the latter of which is permanently connected to the drive of the machine.

In the machines started according to the above known method, upon completion of each cycle the accelerated driven link and the actuating member which is connected thereto, is stopped by damping their energy with the frictional moment developed in the friction brake. With this method for starting the machine irreversible losses of energy due to friction are involved, the losses being determined by the inevitable relative respective slippage between the driving and the driven links while accelerating the actuating member from the steady state to the rated speed and while braking the accelerated masses from their rated speed to the steady state.

Additionally to the energy losses occurring while accelerating or braking the actuating member, the known method entails considerable dynamic loads in the drive and transmission due mainly to the uneven change in the speed of the steady-state driven masses when they are coupled with the driving link (coupling clutch with a flywheel) while continuously rotating at a speed which is close to the rated speed.

The inevitable friction and, in fact, the impact coupling of the driven and the driving links inherent in the known method results in a rapid wear of the friction elements in the friction clutches and brakes, being often the reason for a short service life and failures of not only the clutch and the brake, but other elements of the transmission, the drive and the entire machine as well.

The excessive heating of the friction surfaces caused by the frequent starting and stopping of the actuating member intensifies the wear of the friction materials, upsets the stability of the friction coefficient and the normal functioning of the actuating units, considerably reducing their service life and limiting the permissible number of cycles utilized per unit of time, thus preventing the actual capacity (especially in powerful and rapidly moving machines) from being increased.

The object of the present invention is to increase the efficiency of the machine by reducing the amount of energy consumed within one cycle for accelerating and braking the driven masses.

Another object of the present invention is to provide a reduction in the wear and heating of the friction elements in the clutch and the brake.

Still another object of this invention is to provide improvements in the reliability and the service life of the machine, which are achieved by reducing dynamic loads when starting and braking its driven link and the actuating member.

A further object of the invention is to provide an increase in cycles per unit of time which, in turn, increases the capacity of the machine.

In accordance with the above-mentioned and other objects a method is proposed for starting the actuating member of a machine operating in the mode of repeating cycles consisting in that the driven link of the transmission which is kinematically connected to the actuating member is coupled in turn with the drive of the transmission driving link and the brake. According to the invention, when braking the accelerated masses of the driven link and the actuating member connected therewith, their energy is taken off and accumulated, being subsequently utilized to accelerate the driven link prior to its coupling with the driving link up to a speed which is close to the speed of the driving link.

In order to carry out this method a device is proposed comprising a drive, a brake and a transmission, whose driven link is kinematically connected with the actuating member, and is coupled in turn with the drive through the driving link of the transmission and directly wih the brake. Furthermore, according to the invention, the device incorporates an energy accumulator connected to the driven link of the transmission through a converter which is adapted to transmit energy while braking the accelerated driven link and the accelerated actuating member to the accumulator and from the latter to the driven link so as to accelerate the latter up to a speed which is close to the speed of the driving link prior to their coupling.

It is expedient that the accumulator and the converter form a power cylinder having a movable element which is connected to the transmission driven link through a crank-and-connecting rod arrangement.

The above described embodiment has an extremely simple construction.

It is also advantageous that the converter be constructed in the form of a reversible hydraulic machine which is connected to the driven link, and a hydraulic distributor connecting the hydraulic machine with the accumulator.

That type of construction of the converter allows for reducing its size and installing it anywhere on the transmission.

The method and the device for starting the actuating member of the machine accomplished according to the present invention, provide an improvement in the machine efficiency by reducing energy consumed when accelerating, or when absorbed by the brake, a reduction of dynamic loads exerted on the drive and transmission due to the coupling of the driven and the driving links at the same speed. This will improve the reliability of the machine and its service life by actually providing a complete elimination of slipping between the friction elements which prevents them from being heated so as to, in turn, make it possible to increase the number of cycles per unit of time, and to also increase the capacity of the machine.

Detailed below are specific embodiments of the present invention with reference to the accompanying drawings in which.

Figure 1:
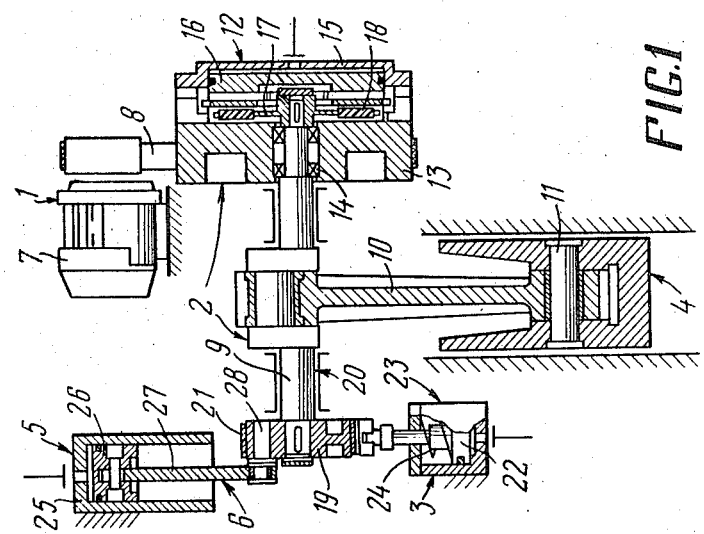
FIG. 1 shows a longitudinal cross-section of a first embodiment of the device for starting the actuating member of a machine, according to the invention.

The device for starting the actuating member of a mechanical press comprises a drive 1 (FIG. 1), a transmission 2, a brake 3, an actuating member 4, an accumulator 5 and a converter 6. The drive 1 incorporates an electric motor 7 and a belt gear 8.

The transmission 2 of the drive comprises a crankshaft 9 whose crank is connected through the connecting rod 10 and the pin 11 with the actuating member 4. Located on the right-hand (see FIG. 1) end of the shaft 9 is the driving link 12 of the transmission 2 comprising a flywheel 13 mounted on the shaft 9 on bearings 14 and connected with the motor 7 through the belt gear 8; a cover 15 rigidly connected to the flywheel 13 and containing a piston 16 which forms with the cover 15 a power cylinder connected to the source of pressure (not shown) to control the movement of the piston 16. The piston 16 serves as a pressing disc.

A disc 17 incorporating friction bushings 18 is rigidly fastened to the end of the shaft 9 behind the flywheel 13. The surface of the flywheel 13 located opposite the disc 17, with disc 17, and the pressing disc 16 collectively forming the clutch.

Rigidly fastened to the left-hand end (see FIG. 1) of the shaft 9 is a drum 19. A driven link 20 of the transmission 2 is formed by the crankshaft 9, the driven disc 17 and the drum 19.

The drum 19 is enveloped by the brake belt 21, the latter of which connected to the piston 22 of the power cylinder 23. Inside of the cylinder 23 there is positioned a spring 24.

The brake 3 is formed by the drum 19, the belt 21 and the power cylinder 23.

The device is equipped with an energy accumulator 5 with a converter 6 which is adapted to take off energy when braking the accelerated driven link 20 and the accelerated actuating member 4, thereby reducing their speed to zero before the belt 21 is coupled with the brake drum 19, and to subsequently utilize the stored energy for accelerating the driven link 20 up to a rotational speed which approaches the rotational speed of the driving link 12.

The accumulator 5 is constructed in the form of a cylinder 25 having a piston 26 housed therein. The converter 6 represents a crank-and-connecting rod mechanism, whose connecting rod 27 at one end thereof is pivotably connected with the driven link 20 through the crank 28 rigidly fastened to the drum 19, and at the other end thereof - to the piston 26. The crank-and-connecting rod mechanism of the converter 6 is displaced in the steady state from its upper dead end position in the direction of rotation of the flywheel 13 by an angle somewhat exceeding the angle of friction of the mechanism.

Figure 2:
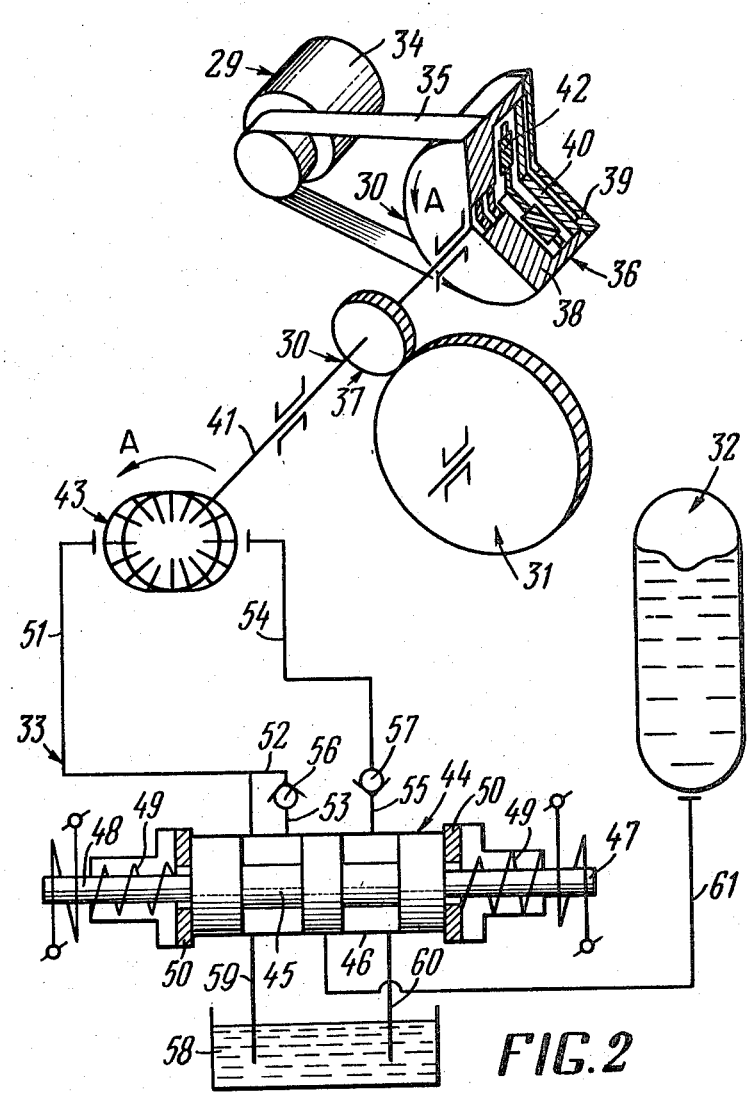
FIG. 2 is a fragmentary sectional view of a second embodiment of the device according to the invention.

The device for starting the actuating member of a machine constructed according to the second embodiment comprises a drive 29 (FIG. 2), a transmission 30, an actuating member 31, an accumulator 32, and a converter 33.

The drive 29 comprises an electric motor 34 and a flexible belt gearing 35.

The transmission 30 incorporates a driving link 36 and a driven link 37.

The driving link 36 comprises a flywheel 38 which is connected to the motor 34 through the belt gearing 35, and a power cylinder 39 having a piston 40 which serves as a pressing disc of the clutch.

The driven link 37 comprises a shaft 41 which is kinematically connected to the actuating member 31, and with a driven disc 42 which is rigidly fastened to the end of the shaft located opposite the flywheel 38.

The accumulator 32 is constructed in the form of a reservoir filled with pressurised operating liquid.

The converter 33 connects the accumulator 32 with the driven link 37 through a reversible hydraulic machine 43 and a hydraulic distributor 44. The movable element of the hydraulic machine 43 is connected to the shaft 41 of the driven link 37.

The reversible hydraulic machine 43 serves as a hydraulic motor when accelerating the driven link 37, and as a hydraulic pump when braking link 37.

The hydraulic distributor 44 incorporates a valve 45 which is located in a housing 46 and which is connected with servomotors 47 and 48. The valve 45 is arranged in the midpoint position by springs 40 acting on thrust washers 50.

The hydraulic distributor 44 is connected to the hydraulic machine 43 by means of conduits 51, 52, 53, 54, 55 and valves 56 and 57. The hydraulic distributor 44 is connected with a discharge tank 58 through conduits 59 and 60, and with the accumulator 32 by means of a conduit 61.

The operating principle of the device for starting the actuating member of a machine operating in the mode of repeating cycles, according to the present invention, is as follows.

Figure 3:
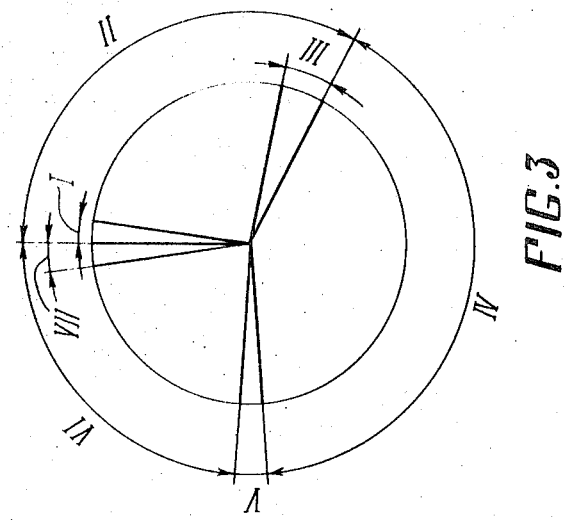
FIG. 3 is a cyclic operating diagram.

With the actuated motor 7 (FIG. 1) and the flywheel 13 revolving at the rated speed, a command is issued to admit compressed air to the cylinder 23. While this takes place, the piston 22 releases the belt 21 by compressing the spring 24, thus releasing the brake of the driven link 20. In FIG. 3 this position corresponds to the segment designated by the numeral 1. The piston 26 (FIG. 1) of the accumulator 5 under the effect of the compressed gas of the receiver (not shown) imparts revolving motion to the driven link 20 through the connecting rod 27 and the crank 28.

Under the effect of the torque developed by the accumulator 5 and the converter 6, the potential energy of the compressed gas is transformed into the kinetic energy of the driven link 20, raising its speed close to the revolving speed of the flywheel 13.

This period of the cycle corresponds to the segment II (FIG. 3). When the speeds of the driven link 20 (FIG. 1) and the driving link 12 are equalized by a command issued earlier from the control system (not shown), the discs 16 and 17 are coupled with the flywheel 13. The command for bringing these friction discs to the flywheel 13 can be issued by making use of both the angle co-ordinate of the crank-shaft 9 and its speed with a necessary lead of the speed equalizing moment in time.

This period of the clutch actuation is marked in FIG. 3 by the segment III.

With this method of coupling the driven link 20 (FIG. 1) with the driving link 12, the slipping and the dynamic loads exerted on the elements of the transmission 2 are almost completely eliminated.

After the actuating member 4 has completed one operating stroke, the discs 16 and 17 disengage from the flywheel 13 (segment V in FIG. 3) on a command from the control system under the effect of the torque developed by the drive 1 and the flywheel 13 with the clutch on, this corresponding to the segment IV.

From the moment these discs have been disengaged, the driven link 20 together with the actuating mechanism 4 having the kinematic energy accumulated in the course of acceleration, continue to move together with the crank-and-connecting rod mechanism of the converter 6 and the piston 26 of the accumulator 5 so as to overcome the resistance of the compressed gas. While this takes place, the accumulated energy is converted into potential energy which is stored in the accumulator 5, and the revolving speed of the driven link 20 slows down until it approaches zero. This period of the cycle is designated in FIG. 3 by the segment VI.

At this moment, upon a command issued from the control system, the brake belt 21 is pressed against the drum 19, thereby fixing the driven link 20 in the steady-state position (Segment VII).

The subsequent cycles are performed in an analogous manner.

The device for starting the actuating member of a machine according to the second embodiment of the invention operates in the following manner.

When the control system (not shown) supplies a signal to the actuating member 31 to start moving, the latter being connected with the shaft 41 of the driven link 37, the servomotor 47 operates and the slide valve 45 takes up its extreme left-hand position.

The liquid contained under pressure in the accumulator 32 is transferred through the distributor 44, the conduit 55, the check valve 57 and the conduit 54 to the hydraulic machine 43, which at that moment serves as a hydraulic motor.

The torque developed by the motor of the hydraulic machine 43 in the direction indicated by the arrow A is imparted to the driven link 37 connected therewith, and consequently to the actuating member 31.

The utilized liquid flowing through the conduit 51 is poured off into the tank 58 through the distributor 44 and the conduit 59.

Under the effect of the torque developed by the hydraulic machine 43, the driven link 37 increases its rotational speed, acquiring kinetic energy at the expense of consuming the potential energy of the accumulator during its discharge.

When the speed of the driven link 37 reaches or approaches that of the flywheel 38, the driving disc 40 and the driven disc 42 upon a signal from the control system engage each other, the servomotor 47 stops and the slide valve 45 takes up the midpoint position under the action of the springs 49 and the washers 50. The rotor of the hydraulic machine 43 is thereby unloaded and the machine is converted into a pump circulating the liquid. The liquid is sucked into the hydraulic machine 43 from the tank 58 through the conduit 60, the distributor 44, the conduit 55, the check valve 57 and the conduit 54, and is then again poured off into the tank 58 through the conduit 51, the distributor 44 and the conduit 59. At this moment the torque is imparted from the drive 29 and the flywheel 38 to the actuating member 31. After the actuating member completes an operating stroke, a command is issued to disengage the discs 39 and 42, and to stop the actuating member 31.

The servomotor 48 is actuated on this command. The slide valve 45 takes up its extreme right-hand position. The rotor of the hydraulic machine 43 sucking in the liquid from the tank 58 through the conduit 60, the distributor 44, the conduit 55, the check valve 57 and the conduit 54, pumps it into the accumulator 32 through the conduits 51, 52, the check valve 56, the conduit 53, the distributor 44 and the conduit 61.

During the process of pumping the liquid into the accumulator 32 by the hydraulic machine 43, the accelerated driven link 37 and actuating member 31 slow down their speed and stop. The rotor of the hydraulic machine 43 is then locked, and the driven link 37 and the actuating member 31 are braked.

To effect the next cycle, t is necessary to repeat the above-mentioned process.

The method carried out according to the present invention provides for the non-shock acceleration and braking of the driven parts of machines or implements operating in repeating single cycles with almost no losses of energy.

This method makes it possible to provide the regeneration and transformation of energy during the process of accelerating and braking transport vehicles operating with frequent stops on short routes.

What is claimed is:

1. A method of starting the actuating member of a machine operating in a mode of repeating cycles, comprising a drive, a brake and a transmission, whose driving link is permanently connected with the said drive, and whose driven link is kinematically connected with the said actuating member, wherein the said driving link prior to its coupling with the said driven link is accelerated up to a speed which is close to the speed of the said driving link to provide for their non-shock and non-slipping coupling, and when the said driven link and the said actuating member connected with it, are braked, their energy is accumulated bringing the speed of the said driven link to zero prior to coupling it with the said brake, utilizing then the accumulated energy to subsequently accelerate the said driven link up to a speed which is close to the speed of the said driving link.

2. A device for starting the actuating member of a machine operating in a mode of repeating cycles comprising: a drive; a transmission having a driving and a driven link: said driven link being kinematically connected to the said actuating member; said driving link being constantly connected with the said drive; a brake adapted to hold the said driven link in a steady-state condition; an energy accumulator; a converter connecting the said driven link with the said accumulator and intended to transmit the energy taken off while braking the driven link and the actuating member to the said driven link to accelerate it prior to its coupling with the said driving link up to a speed which is close to the speed of the latter.

3. A device as set forth in claim 2 wherein the accumulator and the converter are constructed in the form of a power cylinder whose movable element is connected to the driven link through a crank-and-connecting rod mechanism.

4. A device as set forth in claim 2 wherein the converter represents a reversible hydraulic machine connected to the driven link, and a hydraulic distributor connecting said hydraulic machine with the accumulator.

* * * * *